United States Patent Office 3,426,133
Patented Feb. 4, 1969

3,426,133
PEST OR RODENT REPELLENT COMPOSITION
AND ARTICLE TREATED THEREBY
James A. Shotton, Bartlesville, Okla., assignor to Phillips
Petroleum Company, a corporation of Delaware
No Drawing. Filed Mar. 21, 1966, Ser. No. 535,668
U.S. Cl. 424—300                                    9 Claims
Int. Cl. A01n 17/00, 9/18; H01b 7/28

ABSTRACT OF THE DISCLOSURE

Repellent composition for use, for example, to protect polycarbonate containing geophone cases or other articles at least in part made of a polycarbonate which contains a repellent, a ketone, for example, methylethyl ketone and a xylene, for example, a mixture of xylenes as obtained in a refinery and a predominantly isoparaffinic petroleum distillate having a boiling range of from about 335 to about 410° F. In one embodiment the repellent is at least one of N,N-dimethyl-S-methylsulfenyl dithiocarbamate and N,N-dimethyl-S-tert-butylsulfenyl dithiocarbamate. Other control agents or pest repellents can be used, for example, mercapto-benzo-thiozole, cis- and trans-isomers and mixtures of the two of cycloalkane sulfonyl fluorides. The protected article treated with a composition according to the invention can be in any form, for example, pipes, fittings, films, sheets, wires, cables, filaments, moldings, woven fabrics, ropes, etc. Severe cracking of polycarbonate geophone cases is prevented by incorporation with the ketone and xylene solvent mixtures of the predominantly isoparaffinic petroleum distillate.

This invention relates to a pest repellent composition. It also relates to an article treated with said pest repellent composition. Further, it relates to protection of articles against ravage by rodents or other forms of animal life creating ravage. In one of its aspects, the invention relates to a composition of a repellent suitable for application of the repellent to an article which is sensitive to solvents heretofore employed, said solvents consisting essentially of a mixture of a ketone and a xylene and further containing, according to the present invention, a predominantly isoparaffinic petroleum distillate further described herein. In another of its aspects, the invention relates to a composition containing a rodent repellent N,N-dimethyl sulfenyl dithiocarbamate dissolved in a mixture of a low boiling ketone, a low boiling alkyl substituted benzene and a substantially isoparaffinic distillate fraction prepared by hydrofluoric acid alkylation of an isoparaffin with an olefin as further described herein. In another of its aspects, the invention relates to an article protected by a composition of the invention. In a still further aspect of the invention, it relates to a polycarbonate article having thereon a layer of roden repellent material deposited employing the rodent repellent containing composition of the invention.

In Ser. No. 343,775, filed Feb. 10, 1964, by William A. Hensley, Jr. now abandoned, there is set forth and claimed the protection of an article such as natural rubber, synthetic rubber, olefinic polymers, copolymers, high density polyethylene and mixtures thereof employing N,N-dimethyl sulfenyl dithiocarbamate employing xylene as a solvent, in some cases together with methyl ethyl ketone. The use of a mixture of the ketone and xylene as a solvent for applying rodent repellent to geophone cables and cases, though effective, has resulted in stress-cracking in polycarbonate geophone cases, particularly around the metal inserts.

I have found that modifying the solvent mixture by incorporating therein a predominantly paraffinic petroleum distillate as herein described eliminates this stress-cracking.

An object of the invention is to provide a rodent repellent composition. Another object of the invention is to provide a rodent repellent solvent containing composition. A further object of this invention is to provide a rodent repellent composition treated article. A still further object of this invention is to provide a polycarbonate article treated with a rodent repellent composition. A further object still of the present invention is to provide a rodent repellent composition which, when applied to articles of manufacture, particularly articles composed of resinous materials and metal components, will lay down a desired uniform repellent layer or incorporate the repellent in the surface of the article without resulting in stress-cracking.

Other aspects, objects and several advantages of this invention are apparent from a study of this disclosure and the appended claims.

According to the present invention, there is provided a rodent repellent composition comprising an amount of a rodent repellent effective upon application of the composition to lay down a desired amount of repellent and the following ingredients, a ketone which can be represented by the formula

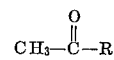

in which R is an alkyl group having 2–4 carbon atoms, a mono- or dialkyl substituted benzene boiling below 150° C. (302° F.), and a predominantly isoparaffinic petroleum distillate having a boiling range of from about 335 to about 410° F.

The rodent repellent particularly suited to the present invention is an N,N-dimethyl sulfenyl dithiocarbamate. Such compounds are described and compositions containing them claimed in U.S. Patent 2,862,850, issued Dec. 2, 1958, to Lyle D. Goodhue.

The now preferred substantially isoparaffinic distillate is now known in the trade under the trademark Soltrol 130 and is a paraffinic petroleum distillate having an initial boiling point of about 335–360° F., a 50 percent point of about 355–370° F., an end point of about 380–410° F., an aniline point of about 182° F. and a specific gravity (60° F.) of about .75–.76. This petroleum distillate is produced by the known hydrofluoric acid alkylation of isobutane with $C_3$–$C_5$ olefins. Other predominantly isoparaffinic material having substantially the given properties can be used. Mere routine testing can be conducted to determine the degree of suitability in a given case of a particular isoparaffin containing distillate. The substantially isoparaffinic solvent of the composition of the invention will have preferably a boiling range of from about 335 to about 410° F. and other properties substantially as numerically given herein.

The following are the properties of the specific Soltrol 130 solvent used in the example.

| | |
|---|---|
| Distillation range, initial boiling point, 0° F. | 349 |
| 10% condensed, ° F. | 355 |
| 50% condensed, ° F. | 364 |
| 90% condensed, ° F. | 382 |
| End point, ° F. | 406 |
| Specific gravity of liquid at 60/60° F. | 0.754 |
| API gravity at 60° F. | 56.2 |
| Density of liquid at 60° F. lb./gal. | 6.28 |
| Bromine number | 0.6 |
| Flash point by TCT, ° F. at 760 mm. | 133 |
| Color, Saybolt | +30 |
| Sulfur content, weight percent | 0.0004 |
| Unsulfonated residue, volume percent | 99.0 |
| Acidity, distillation residue | Neutral |
| Aniline point, ° F. | 185 |
| Copper corrosion, 3 hrs. at 212° F. | 1 |
| Kauri-Butanol value | 25.3 |
| Evaporation rate, minutes | 10 |
| Kinematic viscosity, cs. at 32° F. | 2.775 |
| Kinematic viscosity, cs. at 100° F. | 1.382 |

The ketone which is now preferred is methylethyl ketone. As indicated, other ketones can be used. Such ketones include, in addition to methylethyl ketone, methyl propyl ketone
methyl isopropyl ketone
methyl butyl ketone
methyl isobutyl ketone
methyl sec-butyl ketone
methyl tert-butyl ketone.

The xylene component now preferred is a mixture of xylenes as obtained in the refinery. Any one or more of the xylenes can be used together with other alkyl substituted benzenes, such as toluene and ethyl benzene, or the latter solvents can be employed alone or in admixture. Again, suitability for any particular purpose can be determined by mere routine test.

The solvent composition in which there is dissolved the repellent which it is desired to use will contain by volume for 100 parts of solvent 40±5 parts of the ketone, 20±5 parts of the xylene and 40±5 parts of the isoparaffinic distillate or petroleum fraction. It will be understood by one skilled in the art in possession of the disclosure of this invention having studied the same that some variation from the numerical values given, depending upon the chemical composition of the solvent, can be made without departing from the scope of the invention. Thus, a basic concept of the invention is in the use of the paraffinic distillate to replace, as it were, a portion of at least one other ingredient of the solvent composition.

It will be evident to one skilled in the art that other rodent or pest repellent ingredients might be used to at least in part or substantially totally replace the dithiocarbamate materials recited herein. Thus, the control agent or pest repellent can be for example mercapto-benzo-thiozole, cis and trans isomers and mixtures of the two cycloalkane sulfonyl fluorides. Other agents desired to be incorporated with the protecting ingredient can also be added to the solvent composition.

The article to be treated with a composition according to the invention can be in any form, for example, pipes, fittings, films, sheets, wires, cables, filaments, moldings, woven fabrics, ropes, etc.

The treatment of the article, for example, a geophone case, discussed above, can be accomplished by merely immersing the same in the solvent composition containing the protective ingredient. Other methods of application which are suitable are known in the art. Further, more specific methods of application as described and claimed in above-mentioned abandoned Ser. No. 343,775, filed Feb. 10, 1964 can be employed.

The concentration of the repellent in the solvent composition of the invention will usually be within the approximate range of from about 1 to about 25 weight percent. Concentrations outside this range can be employed.

The following is an example of the invention as applied to polycarbonate containing geophone cases in combination with rubber or polyurethane covered cables.

Rodent repellent R-55 [1] was applied to polycarbonate geophone cases in combination with either rubber or polyurethane covered cables from solutions in the indicated solvents. As is indicated by the data severe cracking of the polycarbonate cases was obtained with xylene or an MEK/xylene mixture as solvent, but was not obtained with the solvent mixture of the invention. The solutions contained 10 g. of R-55 repellent in 100 ml. of solvent unless otherwise indicated.

| Solvent mixture | Cracking of polycarbonate geophone cases | Mg. R-55 repellent deposited per foot | |
|---|---|---|---|
| | | Rubber cable | Polyurethane cable |
| Xylene | Severe | 50 | 10 |
| 50/50 MEK/xylene | do | <10 | 25 |
| 40/20/40 MEK/xylene/petroleum distillate.[2] | None | 12 | 12 |
| Petroleum distillate [a][2] | do | 24 | <10 |
| Kerosene [b][c] | do | 27 | 4 |
| 40/15/45 MEK/xylene/kerosene [c] | do | 30 | 28 |

[1] A trademark for N, N-dimethyl-S-tert butylsulfenyl dithiocarbamate.
[2] Soltrol 130.
[a] 4 g./100 ml. solvent (limit of solubility).
[b] 9 g./100 ml. solvent (limit of solubility).
[c] Evaporation rate too low for practical use.

An examination of the tabulated data shows that the solvents or solvent mixtures other than that of the invention either attack the geophone case or evaporate too slowly for practical use, or that the repellent was non-uniformly deposited, i.e., formed layers of varying thicknesses, that is, thick in one place and thin in another, on the two types of cables.

The solvent of the invention results in deposition of a uniform concentric deposit of repellent on the cables treated therewith.

Reasonable variation and modification are possible within the scope of the foregoing disclosure and the appended claims to the invention, the essence of which is that it has been found that replacing at least a portion of one of the ketone and xylene in a known repellent solvent with an isoparaffinic fraction or distillate as herein described has resulted in a composition effective to uniformly apply rodent or pest repellent to various kinds of articles, particularly to cables and geophones cases, and that, in the case of articles containing polycarbonate, stress-cracking has been avoided.

I claim:
1. A repellent composition consisting essentially of from about 1 percent to about 25 percent of a repellent effective against rodents ravaging polycarbonate geophone cases and cables upon application of the composition to lay down a desired amount of repellent and the following ingredients:

about 35–45 percent of a ketone selected from the group consisting of methylethyl ketone
methyl propyl ketone
methyl isopropyl ketone
methyl butyl ketone
methyl isobutyl ketone
methyl sec-butyl ketone
methyl tert-butyl ketone, about 15–25 percent of a mono- or dialkyl substituted benzene selected from the group consisting of the xylenes, toluene, and ethyl benzene about 35–45 percent of a predominantly isoparaffinic petroleum distillate having an initial boiling point of about 335–360° F., a 50 percent point of about 335–370° F., an end point of about 380–410° F., an aniline point of about 182° F. and a specific gravity (60° F.) of about .75–.76 produced by the known hydrofluoric acid alkylation of isobutane with $C_3$-$C_5$ olefins.

2. A composition according to claim 1 wherein the said ingredients are present in parts by volume as follows:
said ketone, of the order of about 40 parts
said substituted benzene, of the order of about 20 parts
said isoparaffinic petroleum distillate of the order of about 40 parts.

3. A formed article rodent repellent carrier consisting at least in part of a polycarbonate having thereon a substantially uniform concentrically deposited layer of rodent repellent laid down thereon using a composition of claim 1.

4. A composition according to claim 1 wherein the repellent is an N,N-dimethyl sulfenyl dithiocarbamate.

5. A composition according to claim 2 wherein the repellent is one of N,N-dimethyl-S-methylsulfenyl dithiocarbamate and N,N-dimethyl-S-tert-butylsulfenyl dithiocarbamate.

6. A rodent repellent composition according to claim 1 wherein the repellent is at least one of N,N-dimethyl-S-tert-butylsulfenyl dithiocarbamate and N,N-dimethyl-S-methylsulfenyl dithiocarbamate, the isoparaffin distillate has an initial boiling point in the range 335–360° F., a 50 percent point of 355–370° F., an end point of 380–410° F., an aniline point of 182° F., and a specific gravity at 60 of .75–.76, the substituted benzene is a mixture of ortho-, meta- and para-xylene, and the ketone is methyl ethyl ketone.

7. A rodent repellent composition containing an amount of an N,N-dimethylsulfenyl dithiocarbamate upon application of the composition to a material, such as a polycarbonate, ordinarily ravaged by pests or rodents effective to protect said material against said pests or rodents and the following ingredients
about 35–45 percent of a ketone selected from the group consisting of methylethyl ketone
methyl propyl ketone
methyl isopropyl ketone
methyl butyl ketone
methyl isobutyl ketone
methyl sec-butyl ketone
methyl tert-butyl ketone, a mono- or dialkyl substituted benzene selected from the group consisting of xylenes, toluene and ethyl benzene
about 35–45 percent of a predominantly isoparaffinic petroleum distillate having an initial boiling point of about 335–360° F., a 50 percent point of about 355–370° F., and end point of about 380–410° F., an aniline point of about 182° F. and a specific gravity (60° F.) of about .75–.76 produced by the known hydrofluoric acid alkylation of isobutane with $C_3$-$C_5$ olefins, the said ketone being present in parts by volume, approximately 40 parts, said substituted benzene being present in the order of 20 parts, and said isoparaffinic distillate being present in the order of about 40 parts.

8. An electric cable consisting at least in part of a polycarbonate having thereon a substantially uniformly and concentrically deposited layer of rodent repellent laid down thereon using a composition of claim 1.

9. An electric cable according to claim 8 wherein the cable is protected employing at least one of N,N-dimethyl-S-tert-butylsulfenyl dithiocarbamate and N,N-dimethyl-S-methylsulfenyl dithiocarbamate.

References Cited

UNITED STATES PATENTS

| 2,222,638 | 11/1940 | Szilard | 174—116 |
| 2,222,639 | 11/1940 | Pirk | 174—121 |
| 2,621,143 | 12/1952 | Goodhue et al. | 167—22 |
| 2,704,246 | 3/1955 | Goodhue et al. | 71—2.7 |
| 2,862,850 | 12/1958 | Goodhue | 167—46 |
| 2,941,879 | 6/1960 | Goodhue | 71—2.7 |
| 3,005,751 | 10/1961 | Stansbury | 167—38.6 |
| 3,238,097 | 3/1966 | Reinert et al. | 167—46 |
| 3,248,288 | 4/1966 | Wilder et al. | 167—42 |
| 3,252,858 | 5/1966 | Goodhue | 167—46 |
| 3,269,902 | 8/1966 | Goodhue et al. | 167—46 |
| 3,155,756 | 11/1964 | Hechelhammer | 264—178 |
| 3,200,182 | 8/1965 | Hechelhammer | 264—235 |

LEWIS GOTTS, *Primary Examiner.*

S. K. ROSE, *Assistant Examiner.*

U.S. Cl. X.R.

174—116, 121; 117—138.8; 424—27, 30

UNITED STATES PATENT OFFICE
CERTIFICATE OF CORRECTION

Patent No. 3,426,133                                                                                         February 4, 1969

James A. Shotton

It is certified that error appears in the above identified patent and that said Letters Patent are hereby corrected as shown below:

Column 5, line 9, cancel "rodent repellent carrier" and insert the same before "article", same line 9.

Signed and sealed this 31st day of March 1970.

(SEAL)
Attest:

Edward M. Fletcher, Jr.                                    WILLIAM E. SCHUYLER, JR.
Attesting Officer                                                    Commissioner of Patents